United States Patent [19]

Sato

[11] 4,155,302

[45] May 22, 1979

[54] BAR CODE PRINTING DEVICE FOR HAND LABELER

[75] Inventor: Yo Sato, Tokyo, Japan

[73] Assignee: Kabushiki Kaisha Sato, Tokyo, Japan

[21] Appl. No.: 785,356

[22] Filed: Apr. 7, 1977

[30] Foreign Application Priority Data

Apr. 12, 1976 [JP] Japan ................... 51/40384

[51] Int. Cl.$^2$ .......................... B41K 1/12; B41K 1/42
[52] U.S. Cl. .................... 101/106; 101/288;
101/295; 101/314; 101/324; 101/103; 101/110;
400/247
[58] Field of Search ............... 101/287, 288, 314, 108,
101/110, 103–107, 111, 93.13, 298, 93.21, 368,
324, 326, 348, 325; 400/247

[56] References Cited

U.S. PATENT DOCUMENTS

| 471,092 | 3/1892 | Bigelow | 400/247 |
| 701,071 | 5/1902 | Moody | 101/108 |
| 1,247,014 | 11/1917 | Rogers | 101/111 |
| 3,490,365 | 1/1970 | Roche | 101/93.13 |
| 3,805,696 | 4/1974 | Tshji | 101/93.21 |
| 3,817,177 | 6/1974 | Van Arman et al. | 101/288 |

FOREIGN PATENT DOCUMENTS

899479  6/1962  United Kingdom ............... 101/368

Primary Examiner—William Pieprz
Attorney, Agent, or Firm—Ostrolenk, Faber, Gerb & Soffen

[57] ABSTRACT

A printing device for use with a hand operated labeler: the hand labeler includes a pair of juxtaposed spaced end plates fixed to the body of the hand labeler, a support shaft member interposed fixedly between the end plates, and a plurality of bar code rings mounted rotatably on the support shaft member and juxtaposed to one another between the end plates; the bar code rings carry at least bar code types and index characters on their respective outer peripheries; a bar code ring selecting mechanism includes a selecting shaft which is made rotatable and axially movable for selectively turning one of the bar code rings; stain preventive means with a cover plate is provided which is mounted on one of the end plates in a manner to move radially of the bar code rings so that the cover plate may be moved during the printing operations to approach and cover the index characters thereby to prevent them from being stained with ink, and so that the cover plate may be moved during the type selecting operations to leave the index characters so as to allow the bar code rings to be turned freely.

12 Claims, 12 Drawing Figures

BAR CODE PRINTING DEVICE FOR HAND LABELER

BACKGROUND OF THE INVENTION

1. Field of the Invention

The present invention relates generally to a hand labeler, and more particularly to a printing device usable with the hand labeler for printing a label, preferably with bar codes which can be read out by an optical reader.

2. Description of the Prior Art

Recently, POS (Point-of-Sale) scanning systems utilizing electronic computers have been reliably used in large supermarkets. These POS scanning systems use bar codes for information indication. The bar codes, for example, those adopted as UPC symbol marks by the Association of U.S. Supermarkets, are made up of dark bars and light spaces. A printing device for a bar code system generally includes a plurality of bar code rings. Each ring has on its outer periphery the bar code types. It may also carry numeral types and index character types corresponding to the bar code types. The numeral types and index characters are usually arranged at both sides of the bar code types. Moreover, although the index characters are slightly depressed or idented from the surfaces of the bar code types and the numeral types, they are often stained with ink when an inking roller is rolled over the bar code types. This occurs because the inking roller is made of an elastic material, for example, sponge which is brought into contact not only with the bar code types, but also with the index characters. Thus, an operator often cannot easily read the stained index characters correctly.

SUMMARY OF THE INVENTION

It is, therefore, an object of the present invention to provide a printing device, principally of bar code type, for use with a hand labeler, which device is free from the foregoing drawback.

Another object of the present invention is to provide a printing device of the above type, in which index characters are protected from being stained with ink during the printing operations.

The present invention concerns a printing device for use with a hand labeler. The labeler is capable of accomplishing a plurality of operational cycles, each including the steps of printing, dispensing and applying to a product a label that is supplied from a continuous label strip. The printing device includes a pair of juxtaposed spaced end plates that are fixed to the body of the hand labeler, a support shaft member fixedly interposed between the end plates and a plurality of bar code rings rotatably mounted on the support shaft member and juxtaposed to one another between the end plates. The bar code rings carry at least bar code types and index characters on their respective outer peripheries. There is a bar code ring selecting mechanism which has a selecting shaft that is rotatable and is axially movable for selectively turning one of the bar code rings to bring the desired one of the bar code types into its printing position. There is a strain preventive means having a cover plate mounted on one of the end plates in a manner to move radially of the bar code rings so that the cover plate may be brought during the printing operations to approach and cover the index characters. This prevents these characters from being stained with ink. The cover plate may be moved during the type selecting operations to leave the index characters to allow the bar code rings to be turned freely.

BRIEF DESCRIPTION OF THE DRAWINGS

Other objects and features of the present invention will become apparent from the following description taken in conjunction with the accompanying drawings, in which.

DESCRIPTION OF THE PREFERRED EMBODIMENT

Before describing the printing device according to the present invention, the pattern of the bar codes printed by the printing device will be reviewed together with the hand labeler with reference to FIGS. 1 to 3 and 12.

Figure 1:
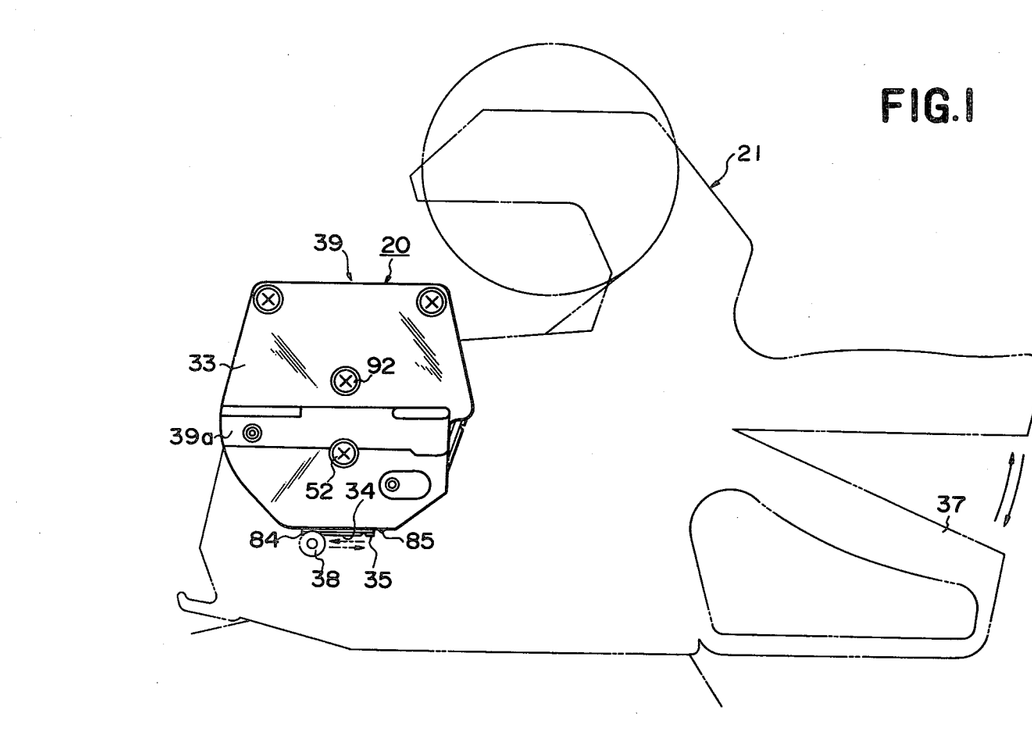
FIG. 1 is a side elevation of a printing device which is installed in a hand labeler for printing bar codes on a label according to the present invention.
Figures 10, 11, 12:
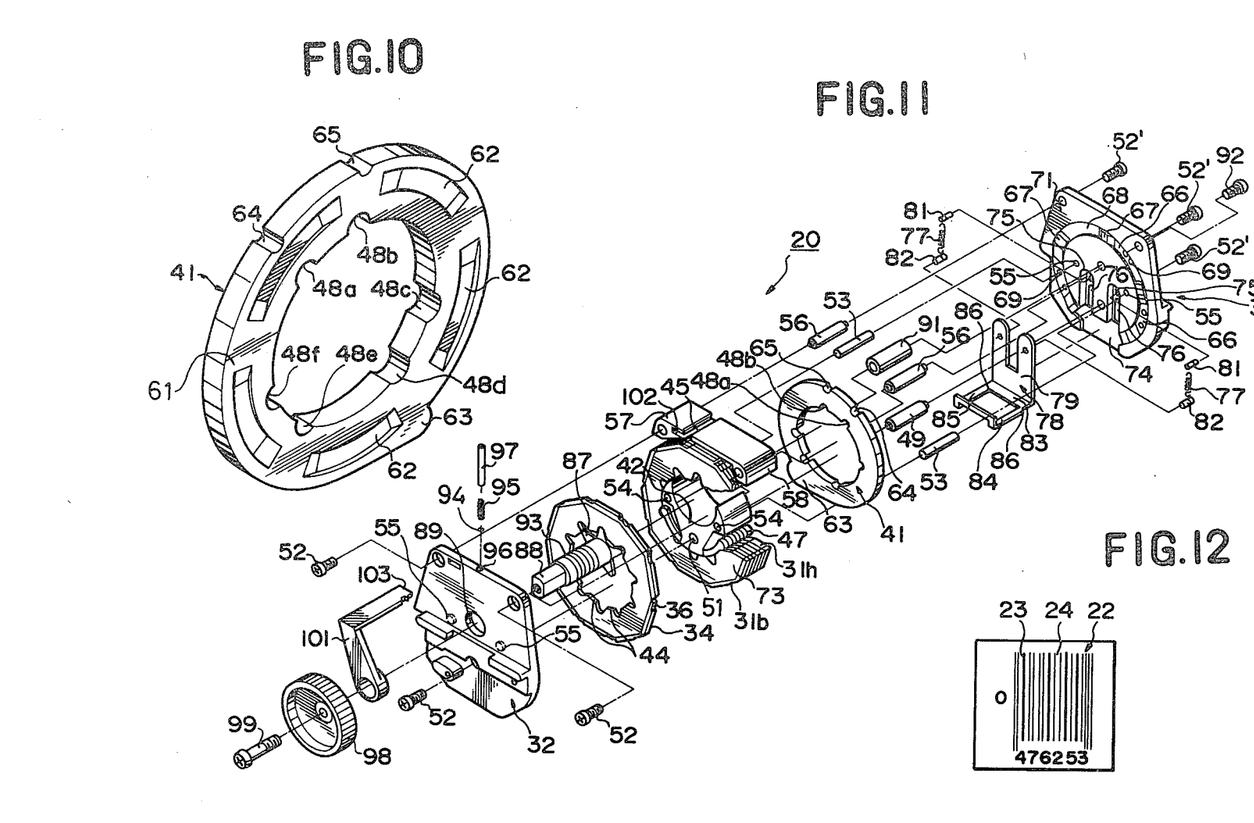
FIG. 10 is a perspective view showing a typeless ring to be used in the printing device.
FIG. 11 is an exploded perspective view showing the assembly and arrangement of the printing device.
FIG. 12 is a top plan view showing an example of a label which has been printed with bar codes by the use of the printing device.

The bar codes adopted as the UPC symbol marks are printed by a printing device 20 of a hand labeler 21, as best shown in FIG. 1. Turning to FIG. 12, each of the bar codes 22 is comprised of dark bars 23, which all have the same length but each of which has a predetermined perhaps different width, and of intermediate light spaces so as to indicate ten numbers from 0 to 9.

Figure 2:
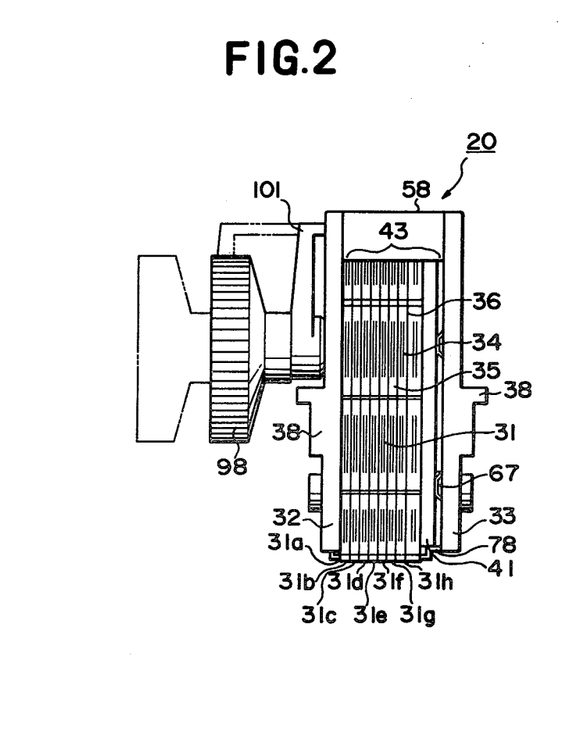
FIG. 2 is a front elevational view of the printing device according to the present invention.
Figure 3:
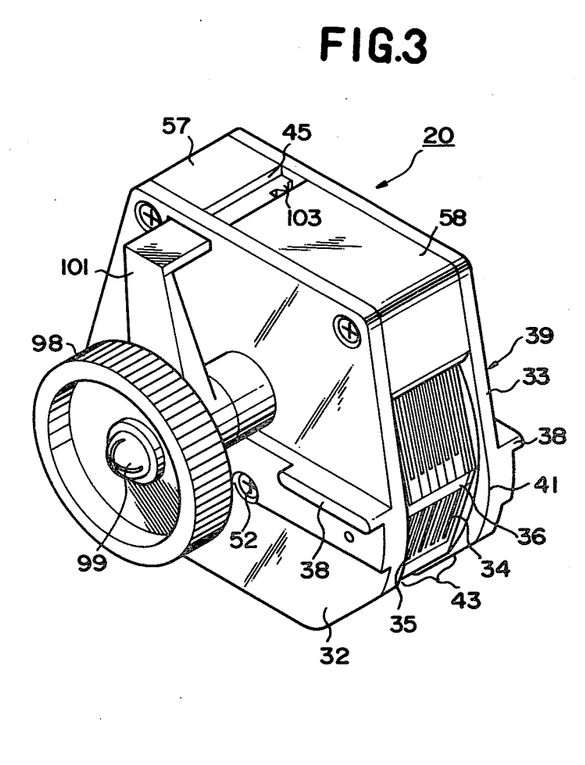
FIG. 3 is a perspective view of the printing device.

As shown in FIGS. 2 and 3, the printing device 20 for the bar codes 22 includes a desired number of bar code rings 31 of regular decagonal shape which are juxtaposed rotatably to one another between two spaced apart end plates 32 and 33. Each of the bar code rings 31 is formed on its respective peripheral sides with bar code types 34 which are arranged to correspond to the ten numbers from 0 to 9. The peripheral sides of the bar code rings 31 are formed with numeral types 35 and index characters 36, which are arranged at both sides of the respective bar code types 34.

Referring to FIG. 1, when hand lever 37 is squeezed and released, an inking roller 38 connected to the lever 37 in a manner known in the art is made to roll on the surfaces of the bar code types 34 in the printing position, namely, in the lowermost position of the printing device 20 so as to supply the surfaces with ink. After that, a printing platen (not shown) also connected to the lever 37 in a manner known in the art is elevated so that a label then placed on the platen may be brought into contact with the two kinds of types 34 and 35 for the printing purposes.

Figure 4:
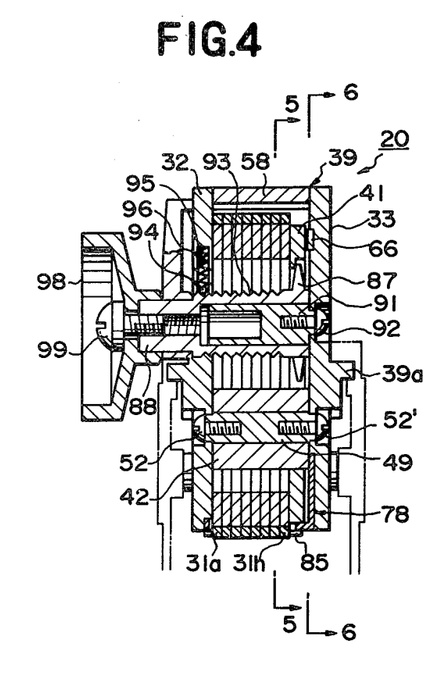
FIG. 4 is a longitudinal cross-sectional view of the printing device.

As better seen from FIGS. 2 to 4, the printing device 20 is fixed to the hand labeler 21 at its upper front portion through a pair of attaching portions 39a protruding from both sides of the frame 39 of the hand labeler 31. A typeless ring 41 and the bar code rings 31 are mounted rotatably on a support shaft member 42 which is interposed fixedly between the end plates 32 and 33. Thus, the bar code rings 31 can be thrust axially of the support shaft member 42 by means of the typeless ring 41 so that their ring components 31a to 31h may be brought into contact to form an integral ring assembly 43, thereby making the bar code printing operations possible. See, for example, application Ser. No. 678,761, filed Apr. 21, 1976. As shown in FIG. 2, each of the bar code rings 31 is formed on each of its ten respective outer peripheral sides, except for the both side ring components 31a and 31h, with the ten numeral types 35 from "0" to "9", with the bar code types 34 and with the index characters 36, both of which are made to correspond to the numeral types 35 in the regular order.

Figure 5:
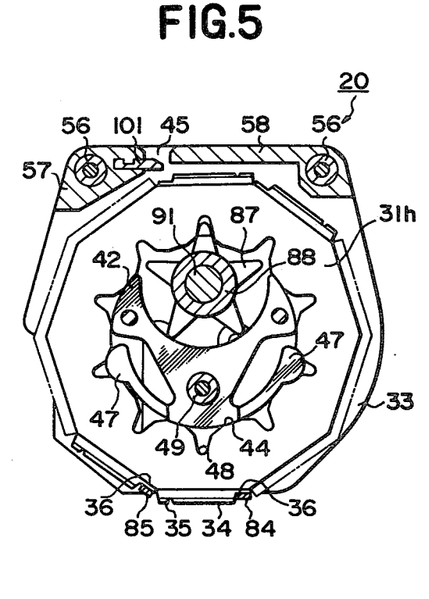
FIG. 5 is a transverse sectional view taken along the line 5—5 of FIG. 4.

As shown in FIG. 5, each of the bar code rings 31 is formed on its inner periphery with internal teeth 44 which correspond in number and spacing to the respective outer peripheral sides. The index characters 36 are slightly radially depressed or indented from the surfaces of the numeral types 35 and the bar code types 34.

Figure 6:
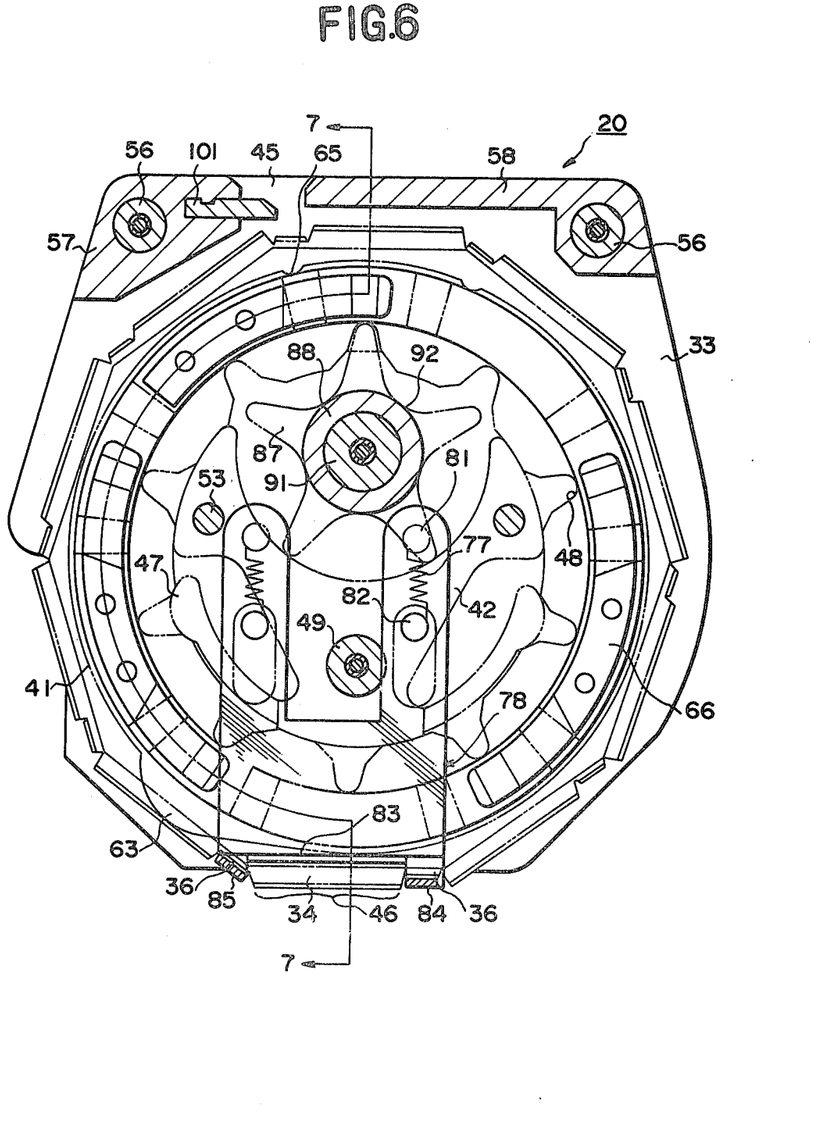
FIG. 6 is an enlarged transverse sectional view taken along the line 6—6 of FIG. 4 and showing the printing device in the printing condition.

The index characters 36 are placed such that, when the bar code rings 31 are turned selectively until the desired index characters 36 appear in an index aperture 45, as best shown in FIG. 3, the corresponding numeral types and bar code types 35 and 34 have been moved to serve as the printing types 46 into the printing positions, namely, in the lowermost positions of the printing device 20, as shown in FIG. 6.

The side ring components 31a and 31b may be used to print the starting codes and ending codes, respectively. For this purpose, the two ring components 31a and 31b may be formed with the bar code types of the same indication, respectively, on their respective decagonal sides. The typeless ring 41 is substantially circular and is interposed between the side ring component 31h and the end plate 33, as will be described in more detail with reference to FIG. 10.

Turning to FIG. 5, the support shaft member 42 is comprised of an integral block, on which are mounted the elastic retaining members 47 which are elastically biased outwardly. These retaining members 47 are juxtaposed to form an integral aligned assembly. There is a respective retaining member 47 for each of the ring components 31a to 31h plus one of the typeless rings 41. The outer periphery of each of the retaining members 47 is formed into such a semi-arcuate shape as can engage the radially inner ends of the internal teeth of the bar code rings 31 and the typeless ring 41. The radial thickness of each of the retaining members 47 is made smaller than the thickness of the annular bar code ring 31 or typeless ring 41 which engages the corresponding member 47. When the ring assembly 43 of the ring components 31a to 31h and the typeless ring 41 are mounted on the support shaft member 42, the respective retaining members 47 for each ring component are retained in the respective grooves 48, which are formed between adjacent internal teeth 44 of the corresponding bar code rings 31 and the typeless ring 41. As a result, the bar code types 34 and the corresponding numeral types 35 of the respective ring components 31a to 31h may be positioned correctly and at the same level, whereby moving along shaft member 42, all rings 31 are aligned with their imprint surfaces facing in the same directions.

Referring to FIG. 11 in addition to FIG. 4, the support shaft member 42 is fixedly mounted between the two end plates 32 and 33. A support shaft 49 is inserted into a through bore 51, which is formed in the support shaft member 42, and this shaft is fixed to the end plates 32 and 33 by means of screws 52 and 52'. Another pair of support shafts 53 are inserted into through bores 54, which are also formed in the support shaft member 42. The free ends of shafts 53 are fitted in four holes 55 which are formed in the end plates 32 and 33. As a result, the support shaft member 42 is prevented from rotating. The spacing between the opposed end plates 32 and 33 is maintained constant by the use of two shafts 56. These shafts also fix index frame plates 57 and 58 to the end plates 32 and 33.

Figure 7:
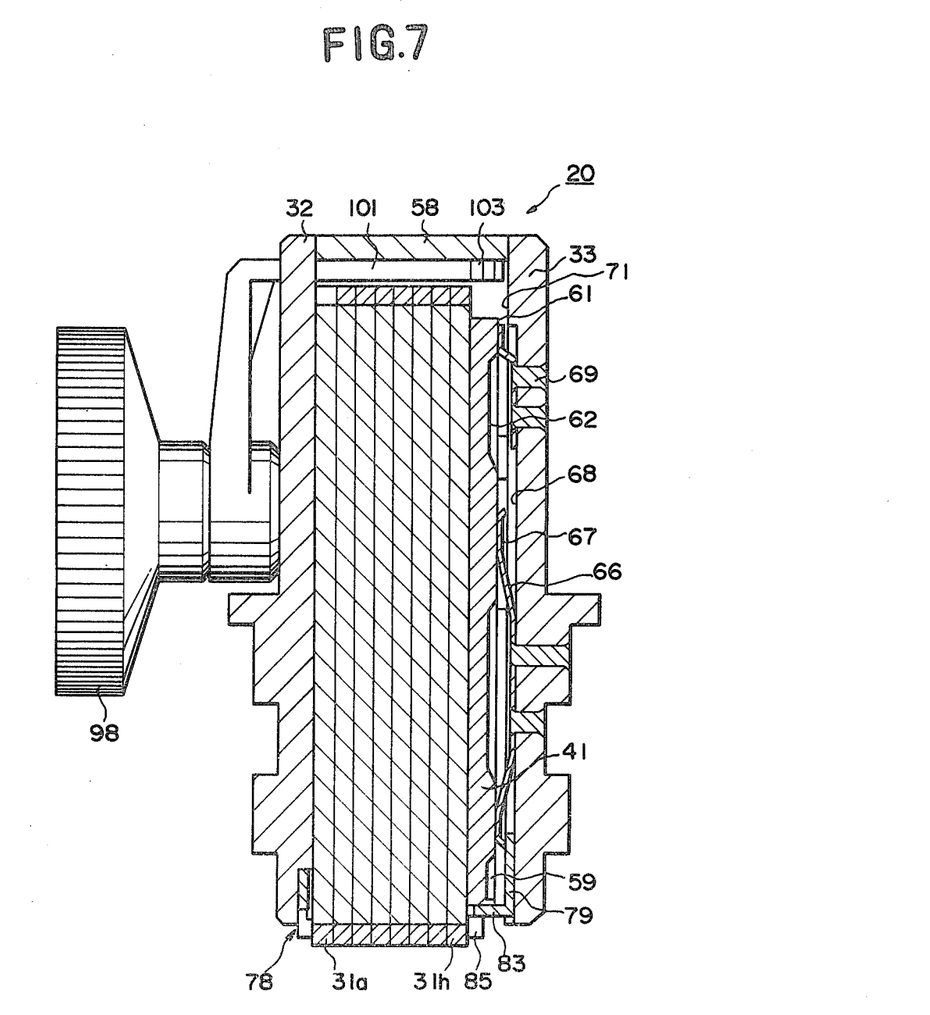
FIG. 7 is a longitudinal sectional view taken along the line 7—7 of FIG. 6.

With this arrangement, the labeler frame 39 is so constructed that the respective ring components 31a to 31h and the typeless ring 41 can slide axially of the support shaft member 42 without any binding or failure. The clearance space between the two index frame plates 57 and 58 is formed into the index aperture 45. Moreover, the longitudinal thickness of the support shaft member 42, i.e. the spacing between the end plates 32 and 33 of the labeler frame 39 is made slightly larger than the thickness of the ring assembly 43 of the ring components 31a to 31h plus the thickness of the typeless ring 41, as best shown in FIG. 7, so that the ring components 31a to 31h and the typeless ring 41 can move axially of the support shaft member 42 by a distance which is substantially equal to the difference in the above thicknesses. The clearance thus formed between the typeless ring 41 and the end plate 33 is called a printing clearance 59.

Turning to FIG. 10, the typeless ring 41 is formed on its side 61 facing the end plate 33 with five arcuate recesses 62 which are engraved into generally trapezoidally shaped depressions and which recesses are equidistantly spaced about a center with the same radius of curvature. The sectional shape of the arcuate recesses 62, taken in the radial direction, is such that they can receive slidably leaf springs 66 at their free ends 67, as will be explained below.

The outer periphery of the typeless ring 41 in FIG. 10 is formed at its lower portion with a radially projecting cam portion 63 and at its upper portion with two display notches 64 and 65. A suitable mark or color for indicating when the device is in condition for the type selection is displayed in the display notch 64, while another suitable mark or color for indicating when the device is in condition for the printing operation is displayed in the other display notch 65. The typeless ring 41 is further formed on its inner periphery with the detent grooves 48 which are renumbered into 48a to 48f. These six grooves 48 are grouped into two pairs of the side grooves 48c to 48f and into one pair of the upper grooves 48a and 48b, which are arranged to correspond to the display notches 64 and 65. The grooves 48 cooperate with the pinion 87 as described below.

As better shown in FIG. 11, the end plate 33, on the side facing the side 61 of the typeless ring 41 in which the arcuate recesses 62 are formed, is formed with a C-shaped groove 68 which has the common center and the same radius as that of the recesses 62. In this C- shaped groove 68, there are arranged the arcuate leaf springs 66 which are fixed to the end plate 33 by means of rivets 69.

Referring to FIGS. 6 and 7, the leaf springs 66 have their free outer ends 67 riding on the side 61 of the typeless ring 41 so that the typeless ring 41 and the ring assembly 43 may be thrust by the biasing forces of the leaf springs 66 in the direction away from the end plate 33 until the printing clearance 59 is established between the side 61 of the typeless ring 41 and the inner side 71 of the end plate 33.

Figure 8:
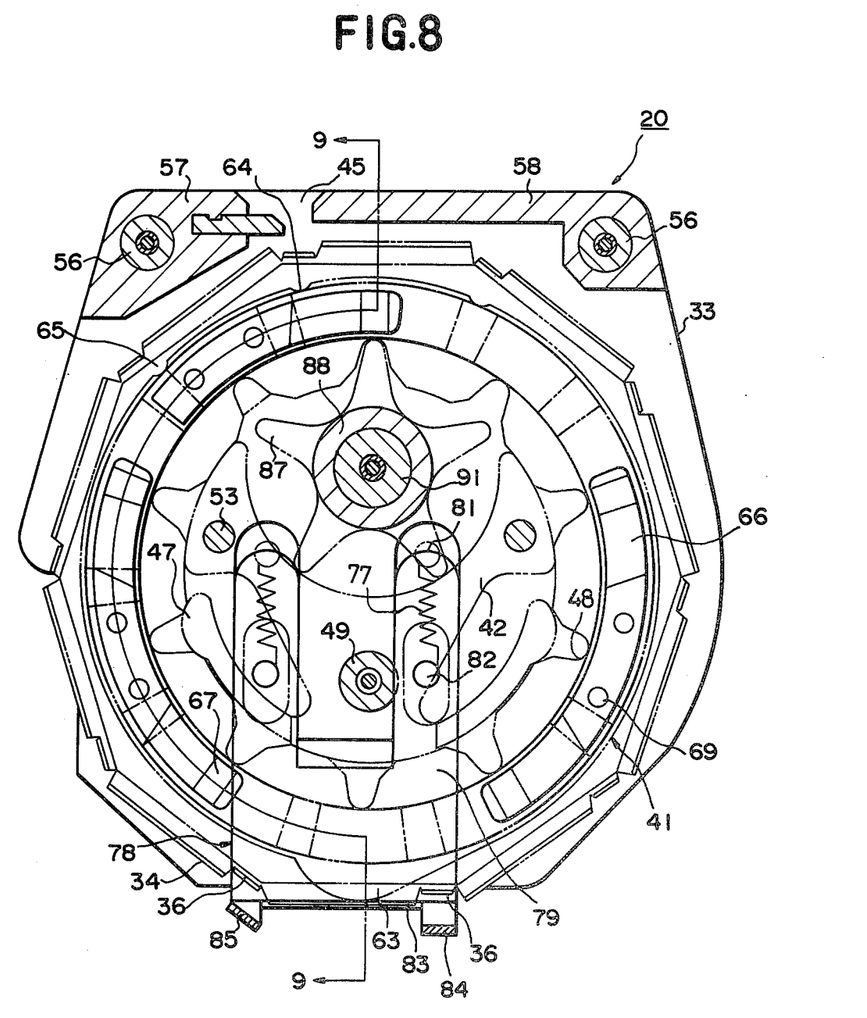
FIG. 8 is a view similar to FIG. 6, but showing the printing device in the type selection condition.
Figure 9:
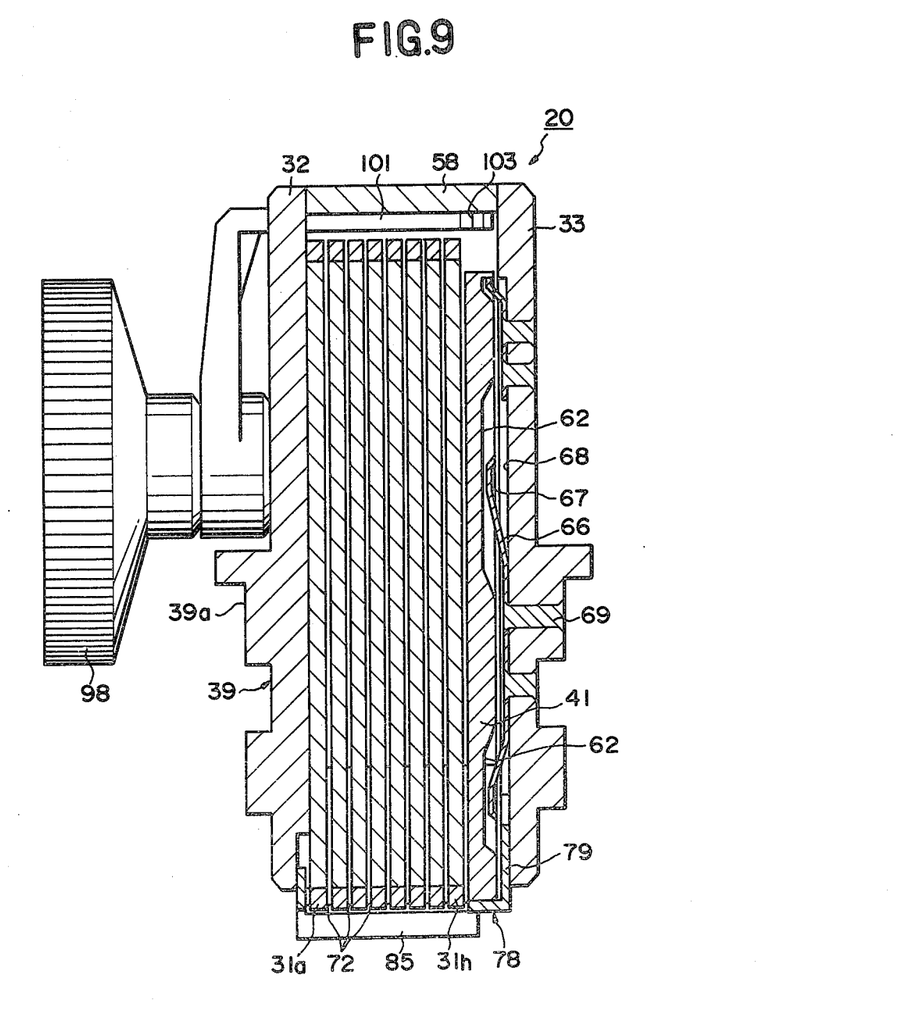
FIG. 9 is a longitudinal sectional view taken along the line 9—9 of FIG. 8.

When, on the other hand, the free ends 67 of the leaf springs 66 are trapped in the arcuate recesses 62 of the typeless ring 41, as shown in FIGS. 8 and 9, then the typeless ring 41 and the respective bar code rings 31 become freely rotatable as a result of formation of rotation allowing clearances 72 in between the rings. Under the former printing condition, when the typeless ring 41 has been thrust or pushed by the springs 66, the respective ring components 31a to 31h have their sides 73 engaging so tightly against one another, as shown in FIG. 7, that the bar code types 34 may be arranged in line for the desired correct printing operations. Under the latter type selecting condition, on the other hand, the ring components 31a to 31h have their sides 73 spaced from one another. This allows the ring components 31a to 31h to be turned freely for the type selection.

Turning to FIG. 11, the lower portion of the C-shaped groove 68 merges into a U-shaped recess 74 in the end plate 33. This U-shaped recess 74 is formed at both of its upstanding leg portions 75 with slots 76, in which coil springs 77 are received. The leg portions 75 are deeper than the merging portions of the U-shaped recess 74 so as to accommodate the coil springs 77, as will be better understood from the following description.

There is a stain-preventive member 78 which is substantially of L-shape. The upright leg of the L-shaped stain-preventive member 78 is a U-shaped upright portion 79 which is arranged to move up and down in the U-shaped recess 74 of the end plate 33. The coil springs 77 are interposed under tension, respectively, between pins 81, which are fixed to upper portions of the legs 75 of the U-shaped recess 74, and pins 82 which are fixed to the upright portion 79 of the stain-preventive member 78.

The lower leg portion of the stain-preventive member 78 includes an imprint access opening formed with a transversely extending cam receiving surface 83 on its top side and with a pair of longitudinally extending cover plates 84 and 85 which are arranged at a predetermined spacing through step portions 86. The leading ends of plates 84 and 85 are joined in a rising manner. The cover plate 84 is arranged in a flat horizontal position. But, the other cover plate 85 is inclined downwardly moving inwardly such that the spacing between the cover plates is equal to the length of a bar code type 34 of the ring 31 plus the length of the respective numeral type 35. In other words, the spacing between the cover plates 84 and 85 is so determined that they can cover and protect the surfaces of both the index characters 36 at the lowermost sides of the rings 31 and the other characters 36 in the next positions, as better seen from FIG. 5. Moreover, the spacing between the joined together end portions of the cover plates 84 and 85 and the cam receiving surface 83 is substantially equal to the total thickness of the ring components 31a to 31h. As a result, the bar code types 34 and the numeral types 35 of the respective ring components 31a to 31h may be exposed for imprinting through the rectangular opening defined by and between the cover plates 84 and 85, their joining portion and the cam receiving surface 83.

In FIGS. 4 and 11, the pinion 87 is integral with a selecting shaft 88. The teeth of this pinion are shaped and spaced to mesh with the internal teeth 44 of the bar code rings 31 and the internal detent grooves 48 of the typeless ring 41. This pinion 87 is arranged in the space which is defined both by the arc formed by the internal crests of the internal teeth 44 of the bar code rings 31 and the grooves of the typeless ring 41 and by the curved upper surface of the support shaft member 42. The selecting shaft 88 is arranged in that space and is oriented parallel to the support shaft member 42. One end of shaft 88 is supported in a shaft receiving bore 89, which is formed in the end plate 32, and that end protrudes through the end plate 32 to the outside. Since the selecting shaft 88 is cylindrical, it can be mounted on a support shaft 91 which is fixed to the end plate 33 in the form of a cantilever by means of a screw 92. This can be accomplished by fitting the support shaft 91 into the bore formed in the selecting shaft 88.

As a result, the selecting shaft 88 is made both slidable in the axial direction of the support shaft 91 and rotatable on the same shaft 91. On the outer peripheral surface of the selecting shaft 88, moreover, there are a plurality of annular grooves of the same number and at the same spacing as that of the respective ring components 31a to 31h and the typeless ring 41 which are juxtaposed to one another. One of the annular grooves 93 at any one time is made engageable with a steel ball 94 which is urged into the shaft receiving bore 89 by a coil spring 95 that is trapped in a blind bore 96 formed in the end plate 32. Plug 97 seals the blind bore 96. By its engagement with the steel ball 94, the selecting shaft 88 can be prevented from free axial movement and can be retained at a desired selecting position.

A selecting knob 98 is fixed to the protruding end of the selecting shaft 88 by means of a screw 99 knob 98 which selectively turns and axially moves the selecting shaft 88 and the pinion 87. Between the selecting knob 98 and the end plate 32, moreover, there is interposed an L-shaped index member 101 which is slidable together with the selecting knob 98 so as to indicate the position of the pinion 87. This index member 101 is guided in a guide groove 102 formed in the index frame plate 57 to move in the index aperture 45 so that the indicator 103 at the leading end of the index member 101 may be shifted along with pinion 87 in the longitudinal direction to point to the index character 36 of any of the ring components 31a to 31h which is then arranged in the index aperture 45. The index character 36 thus indicated can be observed through the index aperture 45.

The pinion 87 is in meshing engagement with the inner-tooth groove 48 of the bar code ring 31 which is then being indicated by the indicator 103. Thus, the desired printing types 46 can be selected by axially shifting the selecting knob 98 until the desired bar code ring 31 is indicated by the indicator 103 and then by turning the selecting knob 98 until the desired index character 36 appears at the position of the indicator 103.

The operation of the printing device 20 has essentially been described in connection with the description of the specific elements. It will however be summarized as follows: Under the imprinting condition in FIGS. 6 and 7, the typeless ring 41 is thrust by the actions of the leaf springs 66 to establish the printing clearance 59 between the inner side of the end plate 33 and the side 61 of the typeless ring 41 and to eliminate the rotation allowing clearances 72, which are formed between the adjacent sides of the respective ring components 31a to 31h, as shown in FIG. 9. Thus, the ring assembly 43 has its components 31a to 31h tightly engaging one another.

Under the printing conditions, therefore, the respective printing types 46 of the respective ring components 31a to 31h, which are arranged at the lowermost surface of the bar code printing device 20 according to the present invention, are also arranged at a proper inter-component spacing so that the bar coding types 34 in line can be prepared for the desired correct printing operations. Simultaneously, the selecting knob 98 is pushed into the printing device 20, and the pinion 87 is in meshing engagement with the typeless ring 41. Moreover, since the elastic retaining members 47 are retained elastically in the inter-tooth grooves 48 of the respective type components 31a to 31h, the printing types 46 of the respective rings 31 are arranged until their type surfaces come to predetermined printing positions correctly on a common plane. In the meantime, because the cam portion 63 of the typeless ring 41 is dislocated from the cam receiving surface 83 of the stain-preventive member 78, and to the left-hand side thereof as viewed from FIG. 6, the stain-preventive member 78 is held in its elevated position so that its cam receiving surface 83 contacts the circular periphery of the typeless ring 41 due to the biasing action of the coil springs 77. This positions the horizontal cover plate 84 to cover the surfaces of the index characters 36, which are positioned at the lowermost surfaces of the bar code rings 31. The other, inclined cover plate 85 is positioned to cover the index characters 36 on the outer peripheral side of the next number.

When, under these conditions, the hand lever 37 is squeezed to turn the inking roller 38 over the printing types 46, the numeral types 35 and the bar coding types 34 are supplied with ink. Since, however, the index characters 36 are covered by the cover plates 84 and 85 of the stain-preventive member 78, they are protected from being brought into direct contact with the ink, even if the spongy inking roller 38 could have touched them, due to its elasticity. As a result, the index characters 36 are kept clean at all times without being stained with the ink. When, moreover, the printing operations are accomplished under these conditions, the widths of the light spaces 24 can always be maintained at proper levels on the resultant label, as shown in FIG. 12. This is because the respective ring components 31a to 31h are held in fixed condition and in close contact with one another. Therefore, the bar codes 22 on the label can assure maximum reliability in their optical reading operations.

When it is intended to select a new set of the printing types 46, the selecting knob 98 is at first left fully inserted as it was, without being moved axially. The selecting knob 98 is turned to rotate the typeless ring 41 by about 36 degrees (the angle corresponding to one side of the ten sides of printing types 46) in the counter-clockwise direction, as viewed from FIG. 6, while keeping the meshing engagement of the pinion 87 with the typeless ring 41, thereby to establish the conditions of FIGS. 8 and 9. Occurrence of these operations can be observed through the index aperture 45 as in the following. At first, the display notch 65 in the outer periphery of the typeless ring 41 appears in the index aperture 45, indicating the imprint position. After the turn of about 36 degrees, however, the other display notch 64 appears in the index aperture 45 to indicate the type selection position. In accordance with this knob turning operation, moreover, the free ends 67 of the leaf springs 66 are allowed to slide from the side 61 of the typeless ring 41 into the arcuate recesses 62. As a result, the single large printing clearance 59 is reduced to render the typeless ring 41 free of the thrusting force of the leaf springs 66. Thus, the respective ring components 31a to 31h can have their contacting sides 73 separated from one another to establish the small rotation allowing clearances 72 so that they can be turned independently of one another.

The cam portion 63 of the typeless ring 41 is also being turned, as shown in FIG. 8, to abut the cam receiving surface 83 of the stain-preventive member 78. By the action of this cam portion 63, the stain-preventive member 78 is lowered against the upward biasing forces of the coil springs 77. As a result, the cover plates 84 and 85 of the member 78 are also lowered to the positions which are separated by such predetermined distances from the respective index characters 36 as to allow free rotation of the respective bar code rings 31.

After this knob turning operation, the selecting knob 98 is pulled until the indicator 103 of the indicating member 101 points to the bar coding ring 31 which it is desired to turn. Then the selecting knob 98 is turned until the desired index character 36 comes to the position of the indicator 103. Thus, the printing type selected can be arranged in the printing position. This operation is carried out for all of the desired bar coding rings 31. After that, the selecting knob 98 is pushed inwardly until the indicator 103 points to the typeless ring 41. Then the knob 98 is turned until the display notch 65 for indication of the imprint position appears in the index aperture 45. This can be done by turning the typeless ring 41 by about 36 degrees to return it to its original position.

During this returning movement, the free ends 67 of the leaf springs 66 are allowed to rise on the side 61 of the typeless ring 41 so that the typeless ring 41 may be thrust in the direction to leave the end plate 33 by the force of the leaf springs 66 seeking to restore the printing clearance 59. Meanwhile, as shown in FIG. 6, the cam portion 63 of the typeless ring 41 is again disengaged from the cam receiving surface 83. As a result, the stain-preventive member 78 is again elevated by the actions of the coil springs 77 so that its cover plates 84 and 85 cover and protect the index characters 36. The rotation allowing clearances 72 are eliminated to bring the respective ring components 31a to 31h into tight contact, as shown in FIG. 7.

In the embodiment thus far described, the cam portion 63 for lowering the stain-preventive member 78 is formed on the outer periphery of the typeless ring 41 which has the function to regulate the spacings between the respective ring components 31a to 31h. However, the cam portion 63 may desirably be formed into a mere cam ring which has no regulating function.

As has been clearly understood from the foregoing description, it should be appreciated that the index characters can be covered, during the printing operations, with the stain-preventive member and be protected from being stained with ink, that the stain-preventive member can be separated, during the type selecting operations, from the printing type surfaces so as to ensure free rotation of the bar code rings, and accordingly that the index characters can be read out correctly at all times so as to select the desired types promptly.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A printing device for use with a labeling machine, comprising at least one coding ring having a plurality of peripheral sides, and each said side of said plurality thereof being provided with an imprintable character to be inked and to imprint and with a non-imprintable index character which is not to be inked and which is not to imprint; means for rotating said at least one coding ring to position a different one of its said sides to face toward a print direction;

stain-preventive means for preventing the inking of and the imprinting by the said non-imprintable character at said side of said coding ring facing in said print direction; said stain-preventive means including a cover plate disposed to be movable toward and away from said coding ring on said side of that said ring facing in said print direction and being shaped and positioned to cover and prevent inking of said non-imprintable character on that said side of said coding ring when said stain preventive means cover plate is moved toward and into engagement with said coding ring and when an inking means is applying ink to said coding ring imprintable character; when said stain preventing means has been moved toward said coding ring, it so engages said coding ring as to prevent rotation thereof; first means for normally moving said cover plate toward said cooling ring; second means operable for moving said cover plate away from said coding ring to enable rotation of said coding ring.

2. The printing device of claim 1, wherein there are a plurality of said coding rings in a juxtaposed array next to one another and each having respective said sides, all of said rings being rotatable to define a common printing plane in which all said imprintable characters on all said sides of said coding rings facing in said print direction may be aligned;

said stain-preventive means cover plate extending across the juxtaposed said array of said coding rings, thereby to simultaneously cover and uncover, respectively, all said non-imprintable characters on the said imprintable side of all said coding rings.

3. The printing device of claim 2, further comprising a common support shaft on which all said coding rings are rotatably mounted for being rotatable thereabout; at least one end plate on said printing device through which said support shaft passes and on which it is supported; said end plate being connected to and supported on said labeling machine.

4. The printing device of claim 3, further comprising a coding ring imprintable type selecting mechanism including a rotatable shaft and means on said shaft for engaging a respective one of said coding rings at a time; said rotatable shaft being axially movable across said array of said coding rings, thereby to be brought into engagement with one said coding ring at a time, for rotating the selected engaged said coding ring.

5. A printing device for use with a labeling machine, comprising a plurality of coding rings in a juxtaposed array next to one another; each said coding ring having a plurality of peripheral sides, and each said side of said plurality of said sides being provided with an imprintable character to be inked and to imprint and with a non-imprintable index character which is not to be inked and which is not to imprint;

means for selectively rotating each said coding ring to position a different one of its said sides to face toward a print direction; all of said rings being rotatable to define a common printing plane in which all said imprintable characters on all said sides of said coding rings facing in said print direction may be aligned;

stain-preventive means for preventing the inking of and the imprinting by the said non-imprintable character at said side of each said coding ring facing in said print direction; said stain-preventive means including a cover plant extending across the juxtaposed said array of said coding rings and being disposed to be movable toward and away from all said coding rings on said side of each said ring facing in said print direction and said cover plate being shaped and positioned to cover all said non-imprintable characters on that said side facing in said print direction of all said coding rings when said stain preventive means cover plate is moved toward and into engagement with said coding rings;

biasing means for normally biasing said stain-preventive means cover plate toward said coding rings and into a position to cover said non-imprintable characters thereof; camming means for raising said stain-preventive means cover plate off said non-imprintable characters when said the camming means is in one position and for permitting said biasing means to urge said cover plate to said non-imprintable characters when said camming means is in another position.

6. The printing device of claim 5, further comprising an end plate being connected to and supported on said printing device; said cover plate of said stain-preventive means being connected to and supported on said end plate and being radially shiftable with respect to said coding rings and with respect to said end plate; said biasing means for said cover plate being interposed between said cover plate and said end plate.

7. A printing device for use with a labeling machine, comprising a plurality of coding rings in a juxtaposed array next to one another; each said coding ring having a plurality of peripheral sides, and each said side of said plurality of said sides being provided with an imprintable character to be inked and to imprint and with a non-imprintable index character which is not to be inked and which is not to imprint;

means for selectively rotating each said coding ring to position a different one of its said sides to face toward a print direction; all of said rings below rotatable to define a common printing plane in which all said imprintable characters on all said sides of said coding rings facing in said print direction may be aligned;

stain-preventive means for preventing the inking of and the imprinting by the said non-imprintable character at said side of each said coding ring facing in said print direction; said stain-preventive means including a cover plate extending across the juxtaposed said array of said coding rings and being disposed to be movable toward and away from all said coding rings on said side of each said ring facing in said print direction and said cover plate being shaped and positioned to cover all said non-imprintable characters on that said side facing in said print direction of all said coding rings when said stain preventive means cover plate is moved toward and into engagement with said coding rings;

biasing means for normally biasing said stain-preventive means cover plate toward said coding rings and into a position to cover said non-imprintable characters thereof; camming means for raising said stain-preventive means cover plate off said non-imprintable characters when said camming means is in one position and for permitting said biasing means to urge said cover plate to said non-imprintable characters when said camming means is in another position;

a common support shaft on which all said coding rings are rotatably mounted for being rotatable thereabout; at least one end plate on said printing device through which said support shaft passes and on which it is supported; said end plate being connected to and supported on a labeling machine;

a coding ring imprintable type selecting mechanism including a rotatable shaft and means on said rotatable shaft for engaging a respective one of said coding rings at a time; said rotatable shaft being axially movable across said array of said coding rings, thereby to be brought into engagement with one said coding ring at a time, for rotating the selected engaged said coding ring.

8. The printing device of claim 7, further comprising inking means supported on said labeling machine and movable with respect to said coding rings at said sides thereof then facing in said print direction, with said stain-preventive means cover plate blocking access of said inking roller to said non-imprintable characters; means for so moving said inking means with respect to said coding rings.

9. The printing device of claim 7, further comprising a camming ring; said camming means being on said camming ring; said rotatable shaft being movable to said camming ring for engaging said camming ring and being capable of rotating said camming ring; said camming ring being rotatable to move said camming means into and out of engagement with said cover plate.

10. A printing device for use with a labeling machine, comprising a plurality of coding rings in a juxtaposed array next to one another; each said coding ring having a plurality of peripheral sides, and each said side of said plurality of said sides being provided with an imprintable character to be inked and to imprint and with a non-imprintable index character which is not to be inked and which is not to imprint;

means for selectively rotating each said coding ring to position a different one of its said sides to face toward a print direction; all of said rings being rotatable to define a common printing plane in which all said imprintable characters on all said sides of said coding rings facing in said print direction may be aligned;

stain-preventive means for preventing the inking of and the imprinting by the said non-imprintable character at said side of each said coding ring facing in said print direction; said stain-preventive means including a cover plate means extending across the juxtaposed said array of said coding rings and being disposed to be movable toward and away from all said coding rings on said side of each said ring facing in said print direction and said cover plate means being shaped and positioned to cover all said non-imprintable characters on that said side facing in said print direction of all said coding rings when said stain preventive cover plate means is moved toward and into engagement with said coding rings;

means for moving said cover plate means toward and away from said coding rings;

said stain-preventive means cover plate means comprising a pair of said cover plates, with one said cover plate being arranged, shaped and positioned to engage the respective said non-imprintable character on the said side of each said coding ring facing in said print direction and with the second said cover plate being shaped, oriented and positioned to simultaneously engage the said non-imprintable character on the side of said coding ring adjacent to the said side then facing in said print direction, whereby said non-imprintable characters on both of the adjacent said sides of said coding ring toward which both said cover plates move are protected against staining by inking rollers or the like.

11. The printing device of claim 10, further comprising biasing means for normally biasing said stain-preventive means cover plate toward said coding ring and into a position to cover said non-imprintable character thereof; camming means for raising said stain-preventive means cover plate off said non-imprintable characters when said camming means is in one position and for permitting said biasing means to urge said cover plate to said characters when said camming means is in another position.

12. The printing device of claim 11, further comprising inking means supported on said labeling machine and movable with respect to said coding rings at said sides thereof then facing in said print direction, with said stain-preventive means cover plate blocking access of said inking roller to said non-imprintable characters; means for so moving said inking means with respect to said coding rings.

* * * * *